March 8, 1966

J. J. HEYDON ETAL 3,239,102

BEVERAGE DISPENSER

Filed April 30, 1964

INVENTORS
JOHN J. HEYDON
BY OHMER V. CLAWSON

Thomas S. MacDonald

ATTORNEY

March 8, 1966     J. J. HEYDON ETAL     3,239,102

BEVERAGE DISPENSER

Filed April 30, 1964     3 Sheets-Sheet 2

INVENTORS
JOHN J. HEYDON
OHMER V. CLAWSON
BY
Thomas S. MacDonald
ATTORNEY

March 8, 1966 J. J. HEYDON ETAL 3,239,102
BEVERAGE DISPENSER
Filed April 30, 1964 3 Sheets-Sheet 3
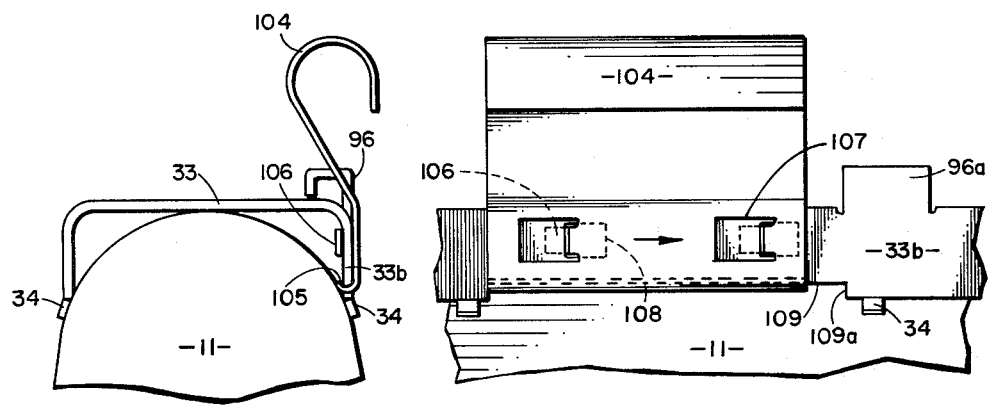
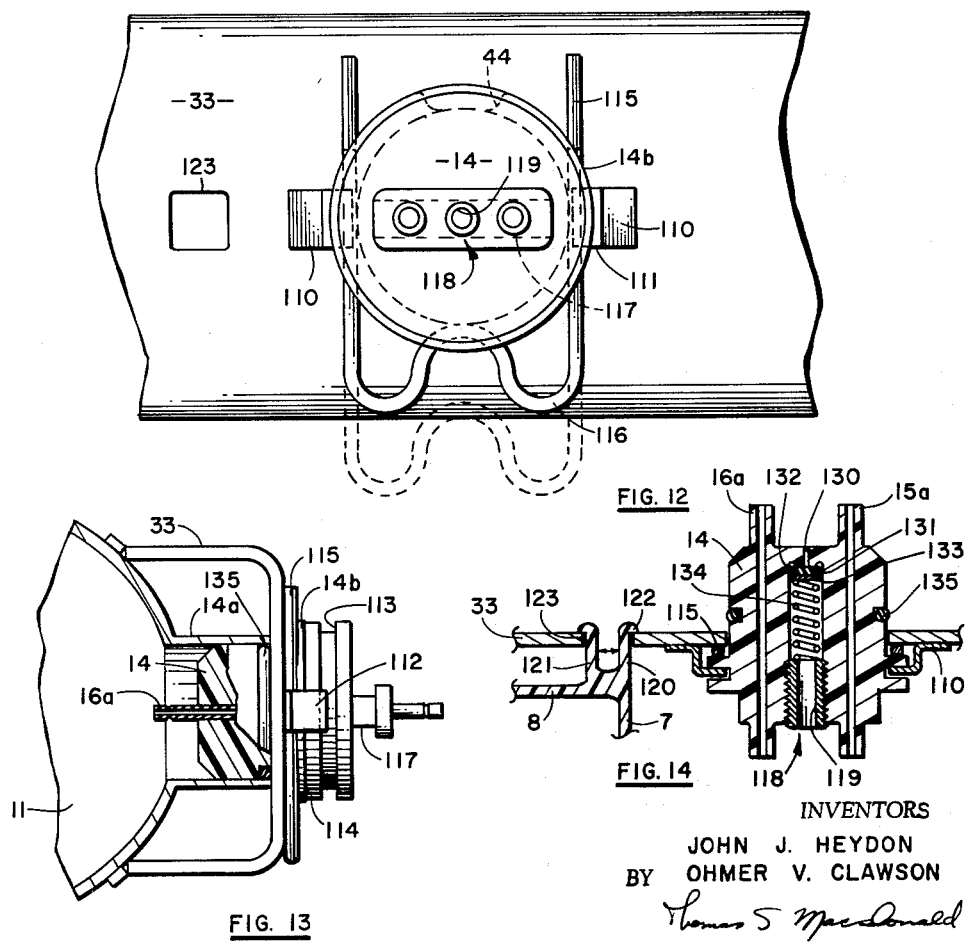
INVENTORS
JOHN J. HEYDON
BY OHMER V. CLAWSON
Thomas S. MacDonald
ATTORNEY

United States Patent Office 3,239,102
Patented Mar. 8, 1966

3,239,102
BEVERAGE DISPENSER
John J. Heydon, Fullerton, and Ohmer V. Clawson, Newport Beach, Calif., assignors to Pacific Sales, Inc., Costa Mesa, Calif., a corporation of California
Filed Apr. 30, 1964, Ser. No. 363,810
19 Claims. (Cl. 222—52)

This invention is directed to a self-contained beverage dispenser suitable for use with any type of carbonated beverage. More particularly, the self-contained beverage dispenser of this invention is adapted for the dispensing of draught beer.

One of the major objections to the use of draught beer in the home is that a homeowner must purchase a quarter or half keg of beer along with various auxiliary equipment including a tap rod, pressure regulator and a carbon dioxide ($CO_2$) cylinder for maintaining the optimum carbonization of the fluid within the keg. Dependent on whether beer is pasteurized or unpasteurized, a suitable refrigeration means must be provided to refrigerate the keg. Thus it can be seen that there may be much inconvenience in having draught beer available in the home.

Various draught beer dispensers have been proposed for home use but each of these takes the form of a reconverted refrigerator into which a conventional beer keg may sit, generally with some type of draught arm extending from the refrigeration portion to a top surface whereby the beer itself may be dispensed. These units, however, are generally expensive, take up additional floor space in a room as well as, in some instances, being esthetically unpleasing in environment and aroma.

U.S. Patent No. 3,032,055 shows an improved liquid dispenser in which a self-contained unit is adapted to be placed directly within a beer container or keg. While this unit has applicability to home use, difficulty is had with respect to its adaptability in homes without providing for special refrigeration equipment. The present invention provides a dispensing apparatus which insures draught beer quality along with convenience to the average home owner. The drawbacks of the prior art devices are solved by providing a unit which may be purchased in toto from retail sources and kept under refrigeration in the conventional home refrigerator. The device provides a dispensing apparatus which insures quality of the product from the time the product is made until it is dispensed by the consuming public directly into the drinking glass. It is a device which the home owner does no servicing, finds extremely easy to operate and additionally is easy and quick to assemble, remove, clean, maintain and refill by the distributor or brewery. The device is also tamperproof to a large degree from the machinations of the ultimate user.

An object of this invention is to provide a self-contained liquid dispenser suitable for storage in conventional refrigerators.

A further object of this invention is to provide a self-contained liquid dispenser of maximum beverage capacity in a minimum size unit containing all apparatus necessary for the maintenance and dispensing of the liquid product.

A still further object of this invention is to provide a self-contained dispenser of protable nature suitable for purcsase by the home owner in retail stores.

An additional object of this invention is to provide a draught beer dispenser suitable for storage in a conventional refrigerator or ice box found in the average home, from which the beverage may be directly dispensed.

Further objects of this invention include providing improved means of regulating the $CO_2$ pressure within the defined beverage and improved means for dispensing the product through the draught arm.

The above objects, as well as other objects of this invention, will be seen in the accompanying drawings in which:

FIG. 9 is a top view of the dispensing arm connection;

FIG. 10 is a partial side view of an alternative handle configuration;

FIG. 11 is a partial top view of such handle;

FIG. 12 is a front view of an alternative bung locking device;

FIG. 13 is a side view thereof showing the inserted portion of the bung in partial cross-section; and FIG. 14 is a top view of an alternative locking means for the protective cover showing also a cut-away top view of the adjacent bung.

The invention hereinafter described comprises a generally rectangular shaped outer casing having a majority of its confined volume enclosing a metallic or plastic beverage-containing tank containing the beverage to be dispensed, pressurizing means connected to the tank and extending longitudinally along the major axis of said tank and regulator means mounted exterior of said tank connected to the pressurization means to regulate pressure within the tank. An on-off demand valve is provided, operable from the front surface of the over-all container, so as to dispense the beverage situate in the tank. The over-all casing has an optimum range of height, length and depth so as to accommodate a maximum beverage supply, and the pressurizing, regulating and dispensing mechanisms so that the over-all unit may be accommodated in a conventional home refrigerator.

Figure 1:
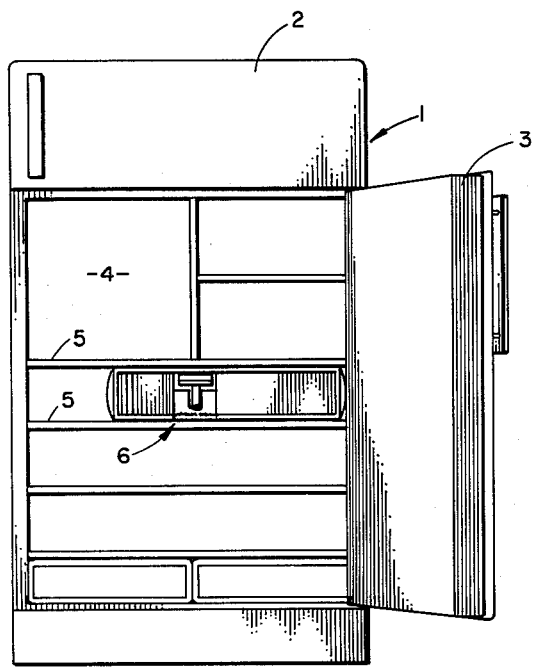
FIG. 1 shows a front view with open door of a conventional refrigerator with the beverage containing unit situate therein.

FIGURE 1 shows a conventional two-door electric or gas refrigerator used in millions of homes. This refrigerator, generally designated as 1, contains a freezer compartment sealed by a pivoted door 2 and a refrigeration compartment 4 sealed by the door 3. Various spaces are provided to accommodate various types of food. Generally several wide, broad shelves 5 are provided at the bottom of the refrigerator above pull-out drawers for vegetable and fruit hydrators. On one of the convenient shelves within the refrigerator is placed the dispensing unit of this invention designated generally as 6. It will thus be seen that the unit, typically holding the order of four gallons of beverage to be dispensed, takes up minimum room within the refrigerator while providing a supply of beverage equal to approximately 42 twelve-ounce cans as generally bought in bulk in a cardboard container. This supply of beverage is provided in a casing having less cubic inch displacement than that of a conventional cardboard case of 24 twelve-ounce cans. The ease of use of the dispenser is clearly seen since one need only place a glass to an extending spigot and, by pressing a lever bar up, down or even sideways, dispense a beverage into the glass. Alternatively the over-all unit 6 may be removed to a table, for dispensing beverage at a party or social gathering and then conveniently returned to its refrigeration space so that the beverage may be kept in the desired range of temperature.

Figure 2:
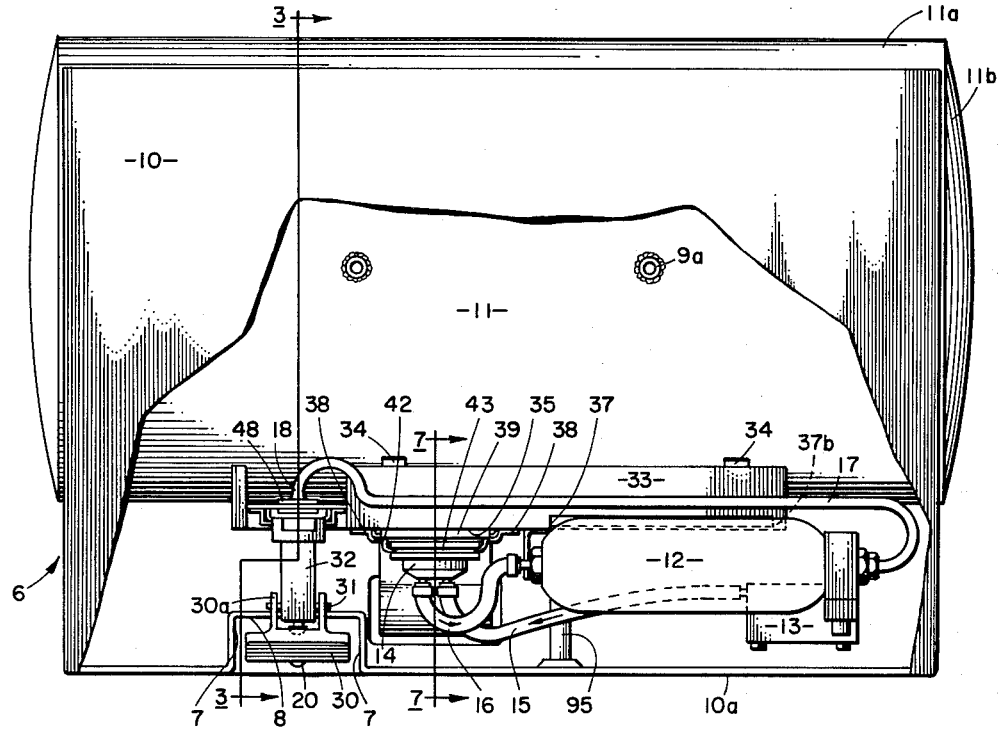
FIG. 2 is a partial cut-away top view of the dispenser unit.

FIGURE 2 is a partial cut-away cross-section top view of the dispensing unit. The unit 6 is a general rectangular U-shaped box having a planar top surface 10 enclosing the top of a beverage containing tank 11. The top 11 extends to the front surface 10a which is generally at right angles to the top surface 10 so as to enclose the pressurization source, a connector-regulator 13 and a dispensing mechanism for the beverage, all of which enumerated parts are situated between the tank 11 and a front dispensing wall 10a. Thus there is provided a unit which is slideable into a conventional refrigerator with the beverage-containing portion in a rearward position, so as to make maximum utilization of the cold present in such refrigerator, while all the carbonization and dispensing controls are situate in the front thereof. Top 10 may further be used as a refrigerator shelf itself when the unit is in the refrigerator. A further feature of this novel arrangement of parts is that the tank 11 may be readily removed from the remainder of the assembly by the distributor or dealer so that it may separately cleaned and refilled at the brewery or other place of beverage manufacture. The beverage-containing tank is of elongated, elliptical shape and preferably has a ratio of length to height of from 3:1 to 6:1. The central section of the section 11a of tank 11 is elliptical or pillow-like in cross-section and is closed at its ends by curved tank ends 11b. Suitable supports, such as tubes 9a extending through said tank, may be welded or otherwise provided to give structural integrity to tank 11. A suitable opening 11c (FIG. 7) is provided at the front section of the tank 11 in the elliptical portion 11a thereof. This opening is generally provided with a welded flange 14a into which a suitable bung or apertured bushing 14 is inserted.

Two passages are provided in the bung 14, one for conducting pressurization gas into the beverage and the other for conducting the pressurized beverage to the dispensing tap. As is shown in FIGURE 2, a small, pressurized gas cylinder 12 normally containing $CO_2$ (carbon dioxide) or other pressurant is the source of pressurizing medium for the beverage. The gas within cylinder 12 is conducted through a pressure regulator 13, described in detail with respect to FIGURE 5, and is conducted to the beverage container 11 through line 15, as shown by the arrow. When beverage is dispensed from the overall unit, it flows from tank 11 through line 16 which preferably extends down the axis of cylinder 12. The beverage exits from heat exchanging relationship with the pressurizing gas in cylinder 12 by line 17 which is in turn connected to an on-off demand valve 32, openable by the depression of an operator 30 and hereinafter explained linkage, through which the dispensed beverage flows into a spigot or draught arm 20 under which is held the glass, mug or pitcher to be filled by the beverage.

Figure 7:
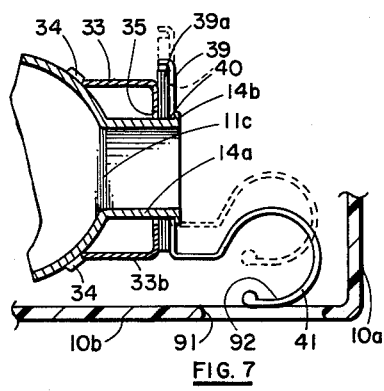
FIG. 7 is a cross-sectional view of the combined locking mechanism and handle prior to assembly taken on the lines 7—7 of FIGURE 2.
Figures 3, 8:
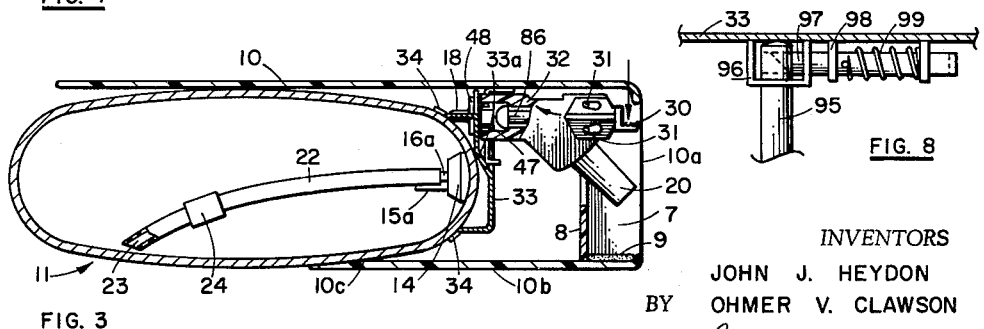
FIG. 3 is a partial cross-sectional view of the dispenser unit taken on the lines 3—3 of FIGURE 2.
FIG. 8 is a top view of the locking means for the protective cover taken on the lines 8—8 of FIGURE 4.

The pressure bottle 12, designed to I.C.C. standards, the regulator and dispensing mechanism are all attached to mounting plate 33 which abuts stops 34. The stops are also seen in FIGURES 3 and 7. Mounting plate 33 is apertured at 35 so as to receive tank flange 14a, apertured at 36 to receive the dispensing arm and slotted at an upper edge portion 37 thereof to receive the contour outer surface of the bottle 12. A strap portion 37a is provided at the end of the slot 37 having a concave curvature corresponding to the convex outer surface of bottle 12.

Mounting plate 33 more particularly comprises a generally U-shaped elongated member having the legs of the U adapted to abut stops 34. The middle aperture 35 provides an opening through which the tank flange 14a extends. On either side of the aperture 35 are provided clips 38 welded to or punched out from the plate 33. A locking member 39 having an aperture 40 therein is slidably connected within the confines of clips 38. Aperture 40 has a circular shape at its top and a rectangular shape at its bottom, thus approximating the overall shape of an arch. Locking member 39 further includes a depending handle portion 41 which serves not only to release mounting plate 33 from tank 11 but also is used by the purchaser or handler to carry or tote the overall unit 6, as seen in FIG. 7. The top edge of aperture 40 in the locking position sits internally of lip 14b of the flange 14a such that plate member 33 is firmly pressed against stops 34.

FIGURE 3 is a partial cut-away cross-section taken on the lines 3—3 of FIGURE 2. A hose bib 16a extends through bung 14 and has attached thereto a flexible tube 22 generally made of rubber or other plastic material which extends to the bottom part of tank 11 so as to discharge all beverage contained in the tank. The tube 22 is provided with a tapered end 23 so that complete emptying of the tank is possible. The tube 22 is kept in position at the bottom of the tank by a weight 24 slidable on the tube 22 so as to provide a curvature keeping the tapered end 23 at the bottom of the tank. Carbon dioxide gas from the pressure bottle is supplied through bib 15a via line 15 and the pressure regulator 13, as seen with respect to FIGURE 2. FIGURE 3 clearly shows the protective enclosure around the tank and the remainder of the pressurizing unit. This protective enclosure comprises the top section 10, a front section 10a, and a bottom section 10b, the latter having a tapered section at its rearward edge seating against the tank surface as at 10c. Protective enclosure 10, 10a and 10b, which portions are generally integrally joined, is removable from mounting plate 33 and tank 11 as hereinafter described. Tube 22 may also be preformed.

The draught arm body and assembly includes the on-off valve 32 operable by depression of push bar 30 around pivot pins 31. Push bar 30 has two arms 30a extending therefrom, each of which arms contains a pear-shape groove in which pivots 31 slide. Upon movement of push bar 30 the fixed pins 31 ride in said grooves to operate a valve operator 86 shown in detail in FIG. 6. Rearwardly of on-off valve 32 is a hose bib 18 to which the tube 17 is attached.

The dispensing spigot 20 and bar 30 are situate in a recessed area formed by side walls 7 and rearward wall 8 (FIGURE 2) in the wall 10a. Wall 8 extends vertically to a distance opposite the lower end of spout 20 so that the spout can clear the wall when the outer casing is removed. A sponge member 9 for catching any drips or spillage from spout 20 is provided at the bottom of the recess. The sponge may be readily removed for rinsing and cleaning.

Figure 4:
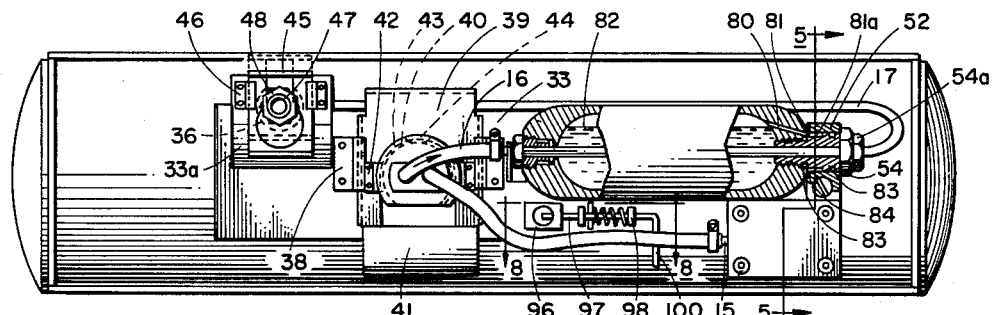
FIG. 4 is a front partially cut-away view of the over-all unit with the dispensing arm and front decorative and protective plate removed.

FIG. 4 shows a front view of the unit with dispensing arm and front walls 10a, 7, and 8 removed, showing the mounting plate 33, the bung 14, and, in partial cross-section, the ends of pressure cylinder 12. The neck of the pressure bottle 12 is provided with a bore 80 extending from the upper inner periphery of the inside of the pressure vessel 12 to an exit 81 adjacent the neck portion of the bottle 12 in communication with an annulus 81a formed between an inserted screw plug 54 and the inner periphery of a bore in the neck 52 of the regulator. Generally speaking, the pressure bottle is filled with $CO_2$ to a filling density of approximately 68%. With this amount of $CO_2$, vessel 12 is filled to a level 82 with liquefied $CO_2$. When, as hereinafter explained, a demand is made on the pressure vessel for flow of carbon dioxide to the inside of tank 11, gaseous $CO_2$ above the liquid level exists from the cylinder 12 by bore 80 though exit aperture 81 from whence it leads by way of the annulus 81a to the regulator. Bore 80 makes it unnecessary to have a separate hose or line leading from the pressure vessel 12 to the regulator. O-ring seals 83 and a flat aluminum seal 84 prevents leakage of $CO_2$ gas along the beverage tube extending longitudinally through the pressure cylinder 12 and the juncture of the regulator-connector throat and bottle 12. These seals are on the upstream and downstream side of the regulator neck 52 which is assembled on the end of pressure bottle 12 by screw plug 54. Internally sealed plug 54a is rotatably threaded into plug 54 and functions to seal the outside periphery of tube 17.

FIG. 4 shows in further detail the attachment of the bung 14 and its associated tubes 15 and 16 to mounting plate 33. Locking member 39 has attached or cut out thereon locking clips 42 on either side thereof which include front offset portions for receiving a grooved edge portion 43 of said bung 14. Slots 44 are provided in the rear wall of said groove such that the slots may be lined up with the clips 42 to allow access of the clips to the groove 43 as the bung 14 is pressed inwardly. When the clips 42 are in the groove 43, the bung 14 is rotated some 90° into the position shown. Thus, bung 14 slides and rotates into clips 42 on member 39, and member 39 correspondingly as a unit slide in clips 38 on plate 33. Bung 14 is thus held in sealed relation to tank flange 14a by the locking action of edge 40 against lip 14b.

Similarly, the disepnsing arm is mountable in aperture 36 of plate 33 and is locked in place by a slidable lock member 45 slidable in offset clips 46 welded on or stamped out from an upstanding portion 33a of plate 33. Member 45 is apertured with an inverted keyhole slot such that in the "up" position it matches aperture 36 in plate 33, allowing removal of the dispensing arm therefrom. The rear of the dispensing arm is adapted to receive a plug 47 having an O-ring situate in a groove on the outer periphery thereof. Plug 47 is attached to hose bib 18 which is connected to line 17. Welded to hose bib 18 are spaced and aligned hex nuts 48. The inner of these nut heads is inserted into a matched hex opening in plate 33a and such sub-assembly rotated approximately 30° so as to be locked by the edge of the hex opening in the groove between hex nuts 48. As shown, the inner of the hex nuts has its outer corners knocked off or rounded similar to a corresponding roundness at the roots of the hex opening in plate 33 such that the rear or outer of hex nuts 48 cannot pass therethrough. After the dispensing arm has been inserted over plug 47, the lock member 45 is slid downwardly through grooves on the rear edge of the dispensing arm to hold the arm in place, as more clearly shown in FIG. 9.

FIG. 4 further shows a mechanism for detachably securing the protective casing from the tank and mounting plate (and its assembled components). A pin 95 is permanently affixed to the inside of the front cover section 10a. Pin 95 in the assembled condition extends in a U-shaped apertured clip 96 welded to or punched from mounting plate 33. A locking operator 97 extends through tabs 98 extending from plate 33 and an aperture in the side of clip 86. A spring held by a suitable pin (FIG. 8) provides a spring-pressed locking action to operator 97 which extends into a slot in the end of pin 95. Pin 95 is released and the entire protective cover is removable by pushing the handle 100 to the right so as to release the operator from the pin slot. FIG. 8 shows a top view of the locking action. A suitable special tool is preferably employable for unlocking the pin, such tool being insertible through an aperture in the case bottom surface 10c (FIG. 7).

Figure 5:
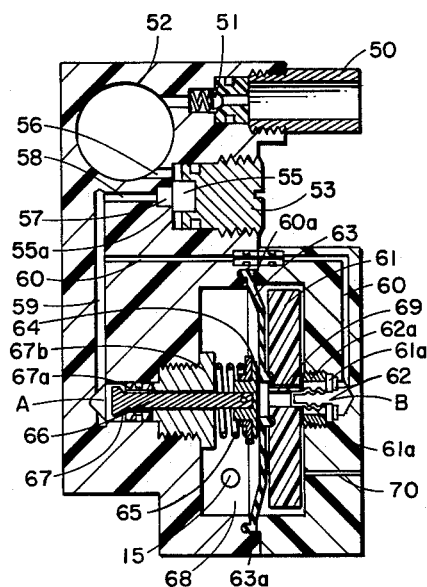
FIG. 5 is a cross-sectional view taken on the lines 5—5 of FIGURE 4.

FIGURE 5 is a cross-sectional view of the pressure regulator assembly which is connected at its throat through the exit portion of pressure bottle 12. Adjacent the throat section is a fill port 50 containing a one-way valve 51 which allows liquid $CO_2$ to be transferred into the pressure bottle by flow through the tube 50 through the one-way valve 51 into the neck cavity 52, more particularly the annulus 81a (FIG. 4). In operation gaseous $CO_2$ passes out bore 80 through bore end 81 into annulus 81a and is conducted by passage 56 into the regulator. Prior to proceeding through bore 57 a shut-off valve 55 is provided whereby turning of the screw 53 will press bottom portions thereof into a valve seat 55a shutting off of $CO_2$ from the pressure bottle 12. When valve 55 is in the open position, $CO_2$ gas will progress through the valve through a sintered bronze porous filter 57 (preventing contamination of the hereafter described poppet seat), through bore 58 and proceed by branch lines 59 and 60 to opposite sides of a pressure operated piston assembly. A suitable plastic or metal seal 60a is provided, including peripheral O-rings at each end thereof, to seal bore 60 as it progresses between the two regulator casing parts. The pressure bottle 12, when filled to 65% of capacity with $CO_2$ gas at 38° F., is under 450 p.s.i. This pressure is communicated to chambers A and B on opposite sides of the pressure piston.

The pressure piston comprises a piston member 61 having a central aperture therein. A bellows 61a having an end portion loosely fitted into said central aperture extends into chamber B with its inner volume in communication with chamber B. Bellows 61a is welded to a base ring 61b which is sealed against the regulator housing by gasket 62 by the downward action of an exteriorly threaded collar nut 62a. The bellows is free to move within collar nut 62a against piston 61 in response to pressure changes in chamber B. Thus in the example given, 450 pounds pressure is exerted upon the right-hand side of the piston member 61 through bellows 61a. Situated across the left-hand side of piston member 61 is a centrally apertured circular diaphragm 63. This diaphragm is held in position by the two halves of the regulator casing as at 63a. Abutting the diaphragm 63 on the side thereof opposite the piston 61 is a cap member 64 which has attached separately thereof by suitable pin means a valve rod 66 having on the opposite end thereof a valve seat 67. This seat abuts a pulley-like member 67a having an O-ring thereon. Situate between a flange of a threaded plug 67b and a retainer abutting the left side of cap 64 is a spring 65 which exerts a continual force to press member 64 against diaphragm 63. The pressure balance relationship in chambers A and B is such that if a pressure of approximately 12 p.s.i. is present in chamber 68 which surrounds spring 65 and the poppet valve, the pressures acting on the surface at the bottom of rod 66 are equal to the pressures acting on the right-hand surface of piston 61 through bellows 61a from chamber B, thus keeping valve seat 67 in the closed position. As the pressure in chamber 68 decreases due to a volume of beverage being drawn off from the tank and as the pressure in chamber 68 falls below 12 p.s.i., piston 61 moves to the left compressing spring 65 and moving the valve rod 66 also in a leftward direction unseating the valve seat 67 off of the sealing edge of pulley 67a. This permits $CO_2$ gas to pass by the seat 67 into volume 68 so that the pressure therein may be brought back up to 12 p.s.i. If a pressure over 12 p.s.i. or any desirable set pressure is obtained in volume 68, this will act to deflect diaphragm 63 off of its contact with cap 64 so as to allow passage of gas through the central aperture in the diaphragm 63 and through a bore 69 in piston 61. This excess pressure is then allowed to vent off to atmosphere through relief passageway 70 in the regulator casing. As can be seen the pressure from the regulator is communicated to the beverage tank by tube 15 which extends into the volume 68.

The pressure within the dispensing tank and also the amount of dissolved $CO_2$ within the beverage is dependent upon the temperature of the beverage and hence on the environment in which the over-all unit is stored. As the temperature of the beverage increases a greater pressure of $CO_2$ is desired. Likewise, to give a desired quality of product at colder temperatures, a pressure somewhat less than 12 p.s.i. will be in order. The temperature-pressure character of the beverage must be such as to give a degree of carbonization for prescribed quality without being flat or conversely to control the foaming or wildness of the product which results from excessive carbonization generally caused by low temperatures. The keeping of a satisfactory temperature range within pressure bottle 12, which tends to cool by expansion of gas when liquid is drawn from tank 11, is accomplished in part by providing that the dispensed product passes in heat exchange relationship to the liquid $CO_2$ contained in the pressure vessel 12, thus putting "heat" into the $CO_2$ bottle, preventing icing in the regulator and prevents lower temperatures and pressures in vessel 12 by this stabilization heat exchange. Tube 16 passes axially of bottle 12 preventing pressure temperature changes in cylinder 12 sufficiently so as to prevent detrimental changes in the pressure in tank 11. For example, if the beer temperature in tank 11 increases from 38° to 40° F., then liquid $CO_2$ in container 12 would go to 40° F. and at that temperature the $CO_2$ gas would have increased in pressure so that it would cause the regulator to adjust to 13 p.s.i. by a greater pressure having been exerted by bellows 61a against piston 61 and diaphragm 63. Conversely, if the beer temperature decreases from 38° to 36°, the $CO_2$ pressure in container 12 will decrease causing the regulator to adjust to 11 p.s.i., insuring proper carbon dioxide content in the beer at that temperature.

Figure 6:
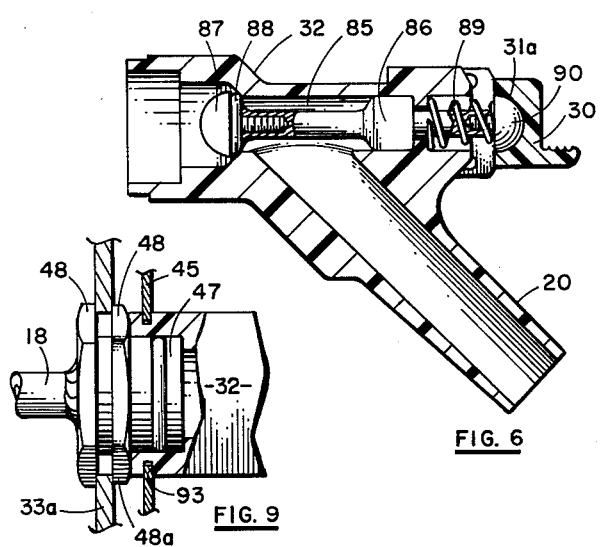
FIG. 6 is a cross-sectional view of the dispensing arm.

FIGURE 6 is a cross-sectional view showing in detail the on-off valve of the dispensing arm. The on-off valve 32 comprises a body member having an aperture 85 through which extends a valve stem 86. The valve stem 86 has a bulbous portion 87 at one end thereof which functions to smooth the flow of beverage from the line 17 leading into bib 18 prior to its flowing by the edge of an O-ring valve seat 88 provided between the flow smoothing portion 87 and the stem portion of valve rod 86. A push button 90 is provided at the end of the valve rod 86 which functions with spring 89 to provide a means for opening and closing the on-off valve at the seat 88. The push bar 30 has a depression 31a corresponding to the curvature of button 90. Depression or movement of bar 30 about pivot points 31 acts to compress push button 90 inwardly opening valve seat 88. Thus it is an easy task to hold the glass or mug or similar container under the spigot 20 while with the other hand press downwardly or upwardly the push bar 30 so as to actuate the on-off valve, permitting flow of beverage through the draught arm 20 directly into the glass from the source of confined beverage in tank 11.

FIG. 7 shows in greater detail the locking action of mounting plate 33. Locking member 39 is apertured at 40 and is slidable in clips 38 (FIG. 4). Inwardly directed flanges 39a are provided on member 39 which abut the front surface of mounting plate 33. When the locking member is slid down, the edge portion 40 thereof seats behind the flange or lip 14b of tank flange 14a. This action forces the horizontal legs of the U-shaped plate 33 to abut stops 34. In the locked position and after the unit cover has been attached, the handle portion 14 is directly adjacent a hand access 91 cut out in surface 10b. Thus, the overall unit may be carried in the manner of a suitcase by inserting several fingers in the aperture 91 to physically grasp the inner surface 92 of handle 41.

FIG. 9 shows in detail the locking of hex nuts 48 in plate portion 33a and the locking action of slide member 45 into grooves 93 formed on the vertical edges at the outer periphery of the rear of the dispensing arm.

FIG. 10 is a partial side view of an alternative handle configuration which is attachable as a separate member in the same general location as handle 41 (FIG. 7). This detachable handle 104 has a small hooked end 105 which seats under a cut-out edge 109 of leg 33b of mounting plate 33 between stops 34. As more clearly shown in FIG. 11, a pair of tabs 106, each extending in the same direction, are punched out of apertures 107 in the longitudinally extending handle 104. Tabs 106 extending longitudinally are bent out of the plane of handle 104 such that they are insertable into a pair of square apertures 108 contained in mounting plate leg 33b. Handle 104 is attached by guiding tabs 106 into apertures 108 while hooking end 105 under cut-out 109. Handle 104 is then shifted laterally so that the root portions of tabs 106 abut corresponding edges of apertures 108 as shown in FIG. 11. The handle is removed by moving the handle in the direction of the arrow such that tabs 106 can be pivoted out of apertures 108 and hook end 105 guided out of cut-out 109. In this position the edge of handle 104 abuts edge 109a of cut-out 109. Also shown in FIG. 11 is the underside 96a of locking clip 96 which is punched out from plate 33.

FIG. 12 is a front view of an alternative bung locking device. Bung 14 is similar to that described above. Welded to or struck out from mounting plate 33 are a pair of locking clips 110 having a vertical portion 112 at right angles to plate 33 and an offset portion 111 parallel to the plate. Slots 44 are provided in the rear flange 114 of bung 14 offset 90° from the finally desired bung position. Slots 44 are wide enough to accommodate the width of portions 111. Bung 14 is passed over portions 111 as it is inserted into tank 11 and then rotated 90° into its assembled position. Flange 114 abuts the outer flat face of lip 14b of flange 14a. A U-shaped clevis 115 having finger grasping portions 116 is insertable between mounting plate 33 and the inner face of lip 14b such that bung 14 is positively held between lip 14b and the clip portions 111 abutting the inner edge of bung groove 113. This prevents any blowing-out of bung 14 from tank 11 and further positively holds plate 33 against stops 34. Clevis 115 is generally made of bar stock and is relatively easy to remove from locking portion by downward movement thereof. The holding action is more clearly seen in FIG. 13 which further shows an O-ring on the external periphery of the portion of bunk 14 insertable into tank flange 14a. A groove 117 is provided on the front of bung 14 over which a pull-out tool may be fitted to remove bunk 14 from flange 14a over the frictional force of its external O-ring. Removal is effected by removing clevis 115 by downward movement and then rotating bung 90° and pulling outwardly. A suitable one-way relief valve 118 may be provided centrally of bung 14 to relieve any over-pressure within tank 11. The bore containing said valve extends parallel to the inlet and outlet bores of the bung. The valve 118 (FIG. 14) typically fits in a central bore having an internal portion 130 of less diameter at its bottom, forming a valve seat 131. As is conventional, a Neoprene disc 132 of greater diameter than the seat and less diameter than the central bore sits on the seat, an aluminum disc 133 of like diameter backs the rubber-like disc, a spring 134 abuts the top of the metal disc and is held in the central bore by a threaded insert collar 119. Over-pressure in the tank pushes the rubber disc off its seat allowing relief past the metal disc and the spring to the exterior of the central bore. Bung 14 thus provides a single device containing a vent for pressurization 15a, a vent for beverage pick-up purposes 16a and a safety vent 118.

It can be seen that the entire assembly attached to mounting plate 33 can thus be bunged into tank 11 after the tank 11 has been filled with beverage with its flange neck 14a held in an upward position. An O-ring 135 situated in a groove on the outer periphery of the entrance porton of bung 14 is adapted to seal the bung in the neck 14a as seen in FIG. 13.

FIG. 14 shows an alternative structure for locking the protective cover on the tank and its associated structure, more particularly to mounting plate 33. A relatively flat plastic extension 120 is provided rearwardly from side wall 7 of the recessed front portion of the cover adjacent the dispensing arm which is seen in FIG. 2. Likewise extending rearwardly from back wall 8 is an arm 121 parallel to arm 120. At the end of each arm is an outward hook-like extension 122 adapted in normal position to seat behind the periphery of a rectangular cut-out 123 (FIG. 12) in plate 33. Removal of the protective cover may be effected by pinching together, as seen by the arrow, the arms 120 and 121 so that hook 122 is released and the arms removed from the aperture 123 bringing the whole protective cover away from tank 11 and plate 33. Arms 120 and 121 are slightly smaller in height than the height of aperture 123. A plier-like tool may be used to effectuate the pinching together of the arms. Such tool is inserted over the top of wall 8 which is shown in FIG. 2.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Self-contained pressurized beverage container comprising a discrete fluid tank, pressurizing means connected to said tank and extending longitudinally externally of and along the major axis of said tank, regulator means exterior of said tank connected to said pressurization means to regulate the pressure within said tank, an on-off demand valve adjacent said regulator means and said pressurizing means connected to the interior of said tank for dispensing a fluid situate in said tank, cover means having a flat top portion generally coextensive with the top of said tank in length and width and a front portion, generally coextensive with the front of said tank in length and height, covering said pressurizing means, said regulator means and said demand valve, said demand valve having an operating and dispensing portion extending through said front portion of said cover means.

2. The invention as set out in claim 1 in which said fluid tank is of elongated elliptical shape and has a ratio of length to height of 3:1 to 6:1.

3. The invention as set forth in claim 1 further comprising stop means secured to said fluid tank, a mounting plate means securing said pressurizing means, said regulator means and said demand valve to said mounting plate, said mounting plate being secured between said stop portions and a flanged entrance to said tank.

4. A liquid dispenser comprising a discrete elongated longitudinally extending liquid-containing tank, entrance and exit means for conducting a pressurizing gas to the liquid interiorly of said tank and for dispensing a fluid from said tank, a gas-containing pressure bottle generally extending parallel to the longitudinally extending axis of said tank exteriorily thereof, a pressure regulator exterior of said tank and connected to an entrance throat section of said pressurizing bottle, the wall of said throat section containing a bore leading from the interior of said pressure bottle to said regulator so as to conduct pressurizing means in the gaseous phase to said regulator, said regulator adapted to regulate the pressure within said tank in a prescribed pressure range dependent upon the temperature of the beverage contained in said tank, conduit means extending from said regulator to said entrance portion of said tank, conduit means extending from an interior portion of said tank through the neck portion of said pressure bottle and extending centrally through said pressurizing bottle through the end thereof opposite said throat section, a beverage dispensing arm generally extending at right angles from the longitudinal axis of said tank adjacent said pressure bottle, means extending from said dispensing arm for actuating an on-off demand valve in said dispensing arm to commence flow of fluid contained within said tank from said dispensing arm.

5. The invention as set forth in claim 4 including a protective casing, said casing including a top section extending coextensively over a top surface of said tank, said pressure bottle, said regulator and said dispensing arm, a front section spaced from said tank and attached to said top section extending generally coextensive with the longitudinal length of said tank and a bottom section extending rearwardly so as to enclose said pressure bottle, said regulator and said dispensing means, said dispensing means including a draught arms and on-off valve operator extending through and exterioraly of said front wall for use in dispensing liquid from said tank.

6. The invention as set forth in claim 5 further comprising a mounting plate for releasably securing said pressure bottle, said regulator and said dispensing arm as a unit thereon, said mounting plate being detachably secured to said tank.

7. The invention as set forth in claim 5 further including an apertured bung containing said entrance and exit means, a longitudinally extending mounting plate, means releasably securing said mounting plate to said tank, means on said mounting plate for releasably securing said pressure bottle, said bung and said dispensing arm.

8. A beverage dispensing unit comprising a pillow-shaped dispensing tank, a generally U-shaped cover means releasably attached to said tank, said cover means having a front wall generally coextensive with the front of said tank in length and height and spaced from a forward edge portion of said tank, tank pressurizing means, pressure regulating means and dispensing means situated in the space formed between said edge of said tank means and the front surface of said cover means, said dispensing means including a valve operator and a spout discharge extending through said front portion of said cover means for dispensing fluid contained within said tank.

9. The invention as set forth in claim 8 further comprising means interiorly of the front wall of said cover means for releasably securing said protective cover means to said tank means and its associated pressure regulator, pressurizing means and dispensing portion.

10. The invention as set forth in claim 8 further comprising means forming a recess in said front wall of said cover means containing said valve operator and said discharge spout.

11. The invention as set forth in claim 8, including a mounting plate detachably secured to said tank and containing a series of apertures having means mounting said pressurizing means, regulator means and dispensing means.

12. The invention as set forth in claim 8 in that a bottom edge of said discharge spout is rearwardly disposed with respect to the front edge of the bottom section of said cover means whereby a vessel to be filled with fluid from said tank is held at an optimum angle for discharge of said gaseous containing beverage.

13. In combination with a carbon-dioxide containing pressurizing bottle for pressurizing a beverage tank, a pressure regulator having a bore portion adapted to surround an entrance neck portion of said pressure bottle, means for filling said pressure bottle through said bore section, means for conducting carbon dioxide in gaseous form from said pressure bottle to a poppet valve assembly in said regulator, conduit means for conducting said gaseous carbon dioxide to a differential piston situate in a cavity of said regulator at an end opposite from said poppet valve assembly, a centrally apertured flexible diaphragm extending across said regulator between said piston and said poppet valve assembly, said poppet valve assembly including a valve seat normally sealing said gaseous carbon dioxide from said first mentioned conduit means from a volume defined by the side of said diaphragm opposite said piston means, said volume being exposed to pressure within said beverage tank, whereby as the pressure in said volume decreases due to the dispensing of beverage from said beverage tank, said piston presses said diaphragm toward said poppet valve assembly to unseat the poppet valve assembly adjacent the first mentioned conduit means so as to permit carbon dioxide gas to pass to said volume to increase the pressure therein and to communicate same to said beverage tank.

14. The invention as set forth in claim 13 further comprising tube means extending through said bore extending longitudinally through said pressure bottle for conducting beverage from said tank to a dispensing arm whereby said gas being regulated is passed in heat exchanging relationship with beverage flowing through said beverage conducting tube.

15. A beverage dispenser comprising an elongated flat pillow-like beverage container, a U-shaped outer casing enclosing at least one side of said container and means, including pressurization means to pressurize said container and an on-off demand valve allowing flow of beverage from said container, in communication with the interior of said container through a single opening in said container side, said means being situate between said container side and said outer casing said opening being located medially of said side between top and bottom portions of said container.

16. Means to mount an assemblage of components exteriorly of liquid-containing tank having spaced stop member and a flanged fill neck extending therefrom, said means comprising a mounting plate generally U-shaped in crosss-section, the ends of the legs thereof adapted to abut said stop members contained on the exterior surface of said tank, said plate including means between said leg means forming an aperture sufficient in size to be inserted over said tank flanged neck and locking means between said plate and said flanged neck whereby said plate is locked to said flanged neck and said legs are forced into abutment with said stop members.

17. A dispensing arm for a liquid-containing tank comprising a valve housing having inlet means adapted to be in communication with said tank, a slidable valve stem having a first end extending into said inlet, a valve seat at said end openable and closable in response to movement of said stem, said stem having a curved head portion at a second end thereof, a valve operator juxtaposed to said head portion and having a complementary curved depression in sliding relation to said curved head portion, means to pivotably attach said operator to said housing, and a dispensing spout between said valve seat and said operator, whereby movement of said operator in any direction causes translation of said stem opening said value seat allowing flow from said spout.

18. A positively locked bung for a liquid-containing tank having locking tabs associated therewith and a flanged fill neck extending therefrom, comprising an entrance portion adapted to be insertable into said fill neck, means on said entrance portion to seal same in said neck, a peripheral flange spaced from said entrance portion and having a diameter greater than said entrance portion adapted to abut a flange on the end of said fill neck, locking groove means spaced from said flange on a side opposite said flange from said entrance portion, spaced slot means contained in said peripheral flange forming peripheral passages into said groove means, whereby said bung is adapted to be held in said fill neck by said locking tabs associated with said tank, said tabs being insertable through said passages into said locking groove means, said bung being rotatable with respect to said tabs to hold said bung in said tank, and means forming outlet and inlet bores in said bung.

19. A generally cylindrical container bung for insertion into a pressurizable container, said bung comprising an entrance portion adapted to be inserted within a container aperture, means on the periphery of said entrance portion to seal same in said aperture, first bore means extending longitudinally through said bung for conducting a pressurizing medium to the inside of the container, a second bore means extending through said bung parallel to said first bore means for conducting from said container a liquid situate therein and a third bore means extending through said bung parallel to said first and second bore means, said third bore means having situate therein a relief valve for relieving overpressure in said container.

References Cited by the Examiner

UNITED STATES PATENTS

| | | | |
|---|---|---|---|
| 2,571,433 | 10/1951 | Fine et al. | 222—52 |
| 2,774,521 | 12/1956 | Creighton | 222—399 |
| 2,873,051 | 2/1959 | Hamburg et al. | 222—399 |
| 3,128,019 | 4/1964 | Mills | 222—61 |

LOUIS J. DEMBO, *Primary Examiner.*

HADD S. LANE *Examiner.*